3,282,862
POLYMERIZATION OF ALKYLENE OXIDES USING ZINC OXIDE-NONMETAL COMPOUND
Alberto Malatesta, Roselle, N.J., assignor to Esso Research and Engineering Company, a corporation of Delaware
No Drawing. Filed July 29, 1963, Ser. No. 298,485
9 Claims. (Cl. 260—2)

This invention relates to a catalyst and process for the production of polymers of an epoxidized mono-olefinic hydrocarbon, i.e. polymers of an alkylene oxide.

The polymerization of alkylene oxides to solid materials is known in the art, and the products are known to be useful as molding and coating compositions, film forming materials, and as a rubber.

By the present invention it has been found that alkylene oxides can be polymerized to solid products by means of a novel catalyst composition. This catalyst is zinc oxide wherein a minor proportion of the oxygen contained therein has been replaced by other Group VI-A non-metals. The amount of this modified zinc oxide which is used may vary widely and the optimum amount for any given set of conditions may be determined by routine experimentation. In general, about 1 to 20 grams of catalyst may be used per 100 grams of monomer, although it is preferred to use 3 to 14 grams per 100 grams of monomer.

The modified zinc oxide which is the catalyst of this invention contains about 0.5 to 5 weight percent, preferably about 0.8 to 3.0 weight percent, of Group VI-A non-metals other than oxygen. These Group VI-A non-metals are sulfur, selenium and tellurium.

The sulfur, selenium and tellurium are present in the combined state; that is they are preferably present for example as zinc sulfide, zinc selenide, or zinc telluride. Additionally, they may also be present in combination with other metals such as iron, nickel, manganese, or lead. The preferred modified zinc oxide is one which contains sulfur, and most preferably is a mixture of zinc oxide and zinc sulfide.

The modified zinc oxide composition may be made even more effective as a catalyst if it is pretreated by heating, preferably in a vacuum, at a temperature in the range of 250 to 500° C., preferably 300° to 400° C. The heating time may vary between about 15 minutes and several hours; however, best results have been obtained by heating for between about 30 minutes and 1 hour. Additionally, the catalyst activity is further increased by ball milling the pretreated product, preferably in an inert hydrocarbon diluent such as heptane or benzene.

The process of the invention is applicable to polymerizing any epoxidized mono-olefinic hydrocarbon—i.e., a hydrocarbon containing an oxirane group. Although the process is especially suited to produce high molecular weight polymers of alkylene oxides, particularly those of 2 to 4 carbon atoms such as ethylene oxide, 1,2-propylene oxide and isobutylene oxide, the process can be used to obtain polymers of any other of the epoxide compounds such as 1,2-butylene oxide, 2,3-butylene oxide, butadiene monoxide, 1,2-pentylene oxide, 2,3-hexylene oxide, 3,4-hexylene oxide, 3-ethyl-2,3-pentylene oxide, 1,2-dodecylene oxide, cyclopentene oxide, cyclohexene oxide, camphene oxide, styrene oxide, benzylethylene oxide, and the like. In being polymers of monoepoxide compounds, the products of the process are thermoplastic substances.

The process of the invention is executed by bringing the epoxy compound in liquid state into contact with the catalyst. The polymerization reaction may be carried out in the presence of an inert solvent—e.g., an aromatic hydrocarbon (benzene, toluene, xylene, etc.), aliphatic hydrocarbon (isopentane, n-hexane, octane, etc.), chlorinated hydrocarbon (carbon tetrachloride, ethylene dichloride, propylene dichloride, etc.), and the like, or the reaction may be effected without solvent. Use of solvent is a convenient means of handling the catalyst. Various amounts of solvent are suitable such as from about 10% to 100% or more of the epoxide treated.

The temperature at which the reaction is carried out may be from about 0° to 200° C. or higher. Usually temperatures of about 30° to 120° C. are employed. The pressure under which the reaction is conducted is from about atmospheric to 40 or more atmospheres. Since the polymerization reaction occurs in liquid phase, sufficient pressure is employed to keep the epoxide compound in liquid condition regardless of whether an inert solvent is present in the reaction mixture or not. The choice of catalyst, temperature and pressure is an effective means of controlling the intrinsic viscosity (molecular weight) of the resulting polymer.

The process of the invention is executed in a closed reaction vessel in either batch or continuous fashion. The epoxide compound is generally added to the catalyst or to a solution of the catalyst in a solvent, but the addition may be in the reverse order if desired. The mixture of epoxide compound in contact with the catalyst is then allowed to stand or is heated to the desired temperature for a time sufficient to obtain a substantial amount of the polymer. Batch operation is usually conducted by bringing the epoxide compound and catalyst together in a closed reaction vessel wherein the desired polymerization occurs with or without stirring of the reaction mixture. It is convenient to effect the polymerization in continuous fashion with use of a residence reactor. In such operation, a mixture of the epoxide compound, catalyst and solvent, if used, is charged to a vessel fitted with an external pump connected by pipes to more or less opposite points of a reaction vessel whereby agitation and circulation is provided. After the desired extent of polymerization has occurred, fresh charge material is fed continuously or intermittently to the vessel and substantially corresponding amounts of reaction mixture are withdrawn. A steady state is reached and the desired polymer is produced in continuous fashion. If desired, the external circuit may be fitted with a heat exchanger to take care of the thermal requirements of the system.

The excess or unreacted epoxide compound remaining in the reaction mixture upon completion of the desired extent of polymerization is separated or recovered by distillation. The resulting product is purified by washing with a non-solvent for the polymer, or by dissolving it in a solvent and slowly precipitating it by addition of a non-solvent miscible with the solvent.

This invention may be more fully understood by reference to the following examples:

EXAMPLES 1–6

A series of polymerizations of propylene oxide were effected wth details as shown in Table I below.

In these experiments, liquid propylene oxide in amounts as shown in Table I was added to a glass container. 2 grams of powdered zinc oxide (modified in some runs, and pure in other runs) was then added to the liquid in the reaction vessel. The vessel was then sealed and heated to temperatures shown in the table below, and for periods of time which are similarly shown below. The vessel was then opened and the solid product (if any) was recovered. The solid product was generally white in color and generally rubbery in nature. Additional details are found in the table which follows. It is to be noted that in Examples No. 2 and No. 5 pure zinc oxide (containing no Group VI-A non-metals other than oxygen) was used, and no polymerization occurred. In Examples 1, 3, and 4, the sulfur was present as zinc sulfide (as determined by standard tests for the sulfide ion). In Example No. 6, selenium was present as zinc selenide.

TABLE I

| No. | ZnO, g. | Propylene oxide, g. | Temp., °C. | Time, hrs. | Polymer, g. | Conversion, percent | $[\eta]^1$ | Crystallinity,[8] percent |
|---|---|---|---|---|---|---|---|---|
| 1 | [2] 2.00 | 43.0 | 40 | 120 | 0.61 | 1.41 | | |
| 2 | [3] 2.00 | 43.0 | 40 | 120 | No polymerization | | | |
| 3 | [4] 2.00 | 17.0 | 32 | 48 | 3.4 | 20.0 | 3.0 | 29.0 |
| 4 | [5] 2.00 | 17.0 | 70 | 17 | 8.5 | 50.0 | 3.7 | 25.0 |
| 5 | [6] 2.00 | 17.0 | 70 | 17 | No polymerization | | | |
| 6 | [7] 2.00 | 17.0 | 70 | 10 | 6.0 | 35.3 | 3.8 | 23.0 |

[1] Intrinsic viscosity measured in toluene at 30° C.
[2] ZnO containing 1% weight of combined sulfur.
[3] Chemically pure ZnO (Baker brand).
[4] ZnO containing 1% weight of combined sulfur heated under vacuum at 350° C. for 1 hour.
[5] ZnO containing 1% weight of combined sulfur heated under vacuum at 350° C. for 1 hour and ball milled for 6 days in n-heptane.
[6] Chemically pure ZnO (Baker brand) heated under vacuum at 350° C. for 1 hour and ball milled for 6 days in n-heptane.
[7] ZnO containing 2.6% weight of combined selenium heated under vacuum at 350° C. for 1 hour.
[8] Determined by X-ray diffraction.

This invention has been described in connection with certain specific embodiments thereof; however, it should be understood that these are by way of example rather than by way of limitation and it is not intended that the invention be restricted thereby.

What is claimed is:

1. A process for polymerizing an alkylene oxide compound containing an oxirane group, which comprises contacting said alkylene oxide compound with zinc oxide containing about 0.5 to 5 weight percent of a Group VI–A non-metal selected from the class consisting of sulfur, selenium and tellurium.

2. The process of claim 1 wherein the Group VI–A non-metal is sulfur.

3. The process of claim 1 wherein the Group VI–A non-metal is selenium.

4. The process of claim 2 wherein the alkylene oxide has 2 to 4 carbon atoms.

5. The process of claim 4 wherein the alkylene oxide is propylene oxide.

6. The process of claim 5 wherein the zinc oxide contains about 0.8 to 3.0 weight percent of sulfur.

7. The process of claim 4 wherein the sulfur-containing zinc oxide is heated in a vacuum at a temperature in the range of 250° to 500° C. prior to being used in the polymerization process.

8. The process of claim 7 wherein the preheated zinc oxide is additionally ball milled in an inert hydrocarbon diluent prior to being used in the polymerization process.

9. The process of claim 7 wherein 1 to 20 grams of the sulfur-containing zinc oxide is utilized per 100 grams of propylene oxide.

No references cited.

WILLIAM H. SHORT, *Primary Examiner.*

T. E. PERTILLA, *Assistant Examiner.*